US006825315B2

(12) United States Patent
Aubert

(10) Patent No.: US 6,825,315 B2
(45) Date of Patent: Nov. 30, 2004

(54) METHOD OF MAKING THERMALLY REMOVABLE ADHESIVES

(75) Inventor: James H. Aubert, Edgewood, NM (US)

(73) Assignee: Sandia Corporation, Albuquerque, NM (US)

( * ) Notice: Subject to any disclaimer, the term of this patent is extended or adjusted under 35 U.S.C. 154(b) by 316 days.

(21) Appl. No.: 10/036,660

(22) Filed: Dec. 21, 2001

(65) Prior Publication Data

US 2003/0116272 A1 Jun. 26, 2003

(51) Int. Cl.[7] .................... C08G 59/26; C08G 65/20; C08K 3/10; C08L 63/00
(52) U.S. Cl. .................... 528/393; 528/322; 528/417; 521/135; 521/178; 523/428; 523/429; 525/410; 525/526
(58) Field of Search .................... 528/393, 322, 528/417; 521/135, 178; 523/428, 429; 525/410, 526

(56) References Cited

U.S. PATENT DOCUMENTS

| 3,765,972 A | | 10/1973 | Wesp ................... 156/71 |
| 3,978,152 A | * | 8/1976 | Gruffaz et al. ......... 528/322 X |
| 4,049,483 A | | 9/1977 | Loder et al. ............. 156/230 |
| 4,122,076 A | * | 10/1978 | Jablonski et al. ........... 528/322 |
| 4,393,188 A | * | 7/1983 | Takahashi et al. ...... 528/322 X |
| 4,687,812 A | * | 8/1987 | Dickie et al. ........... 525/112 X |
| 5,021,519 A | * | 6/1991 | Varde et al. ............ 528/322 X |
| 5,464,902 A | | 11/1995 | Recker .................... 525/119 |
| 5,560,934 A | * | 10/1996 | Afzali-Ardakani et al. ... 528/94 X |
| 5,641,856 A | * | 6/1997 | Meurs .................... 528/310 |
| 5,643,998 A | * | 7/1997 | Nakano et al. ......... 525/528 X |
| 5,726,391 A | * | 3/1998 | Iyer et al. ................ 174/52.2 |
| 6,034,194 A | | 3/2000 | Dershem et al. ........... 526/262 |
| 6,271,335 B1 | * | 8/2001 | Small et al. .............. 528/170 |
| 6,337,384 B1 | * | 1/2002 | Loy et al. ................ 528/393 |

FOREIGN PATENT DOCUMENTS

SU  332108  * 4/1972  ............ 528/393

OTHER PUBLICATIONS

U.S. patent application Ser. No. 09/484,839, Saunders et al., filed Jan. 18, 2000.

Okumoto, S. and Yamabe, S., J., "A Theoretical Study of Curing Reactions of Maleimide Resins Through Michael Additions of Amines," Org. Chem., 2000, 65, 1544–1548.

* cited by examiner

Primary Examiner—Daniel S. Metzmaier
(74) Attorney, Agent, or Firm—Elmer A. Klavetter

(57) ABSTRACT

A method of making a thermally-removable adhesive is provided where a bismaleimide compound, a monomeric furan compound, containing an oxirane group an amine curative are mixed together at an elevated temperature of greater than approximately 90° C. to form a homogeneous solution, which, when cooled to less than approximately 70° C., simultaneously initiates a Diels-Alder reaction between the furan and the bismaleimide and a epoxy curing reaction between the amine curative and the oxirane group to form a thermally-removable adhesive. Subsequent heating to a temperature greater than approximately 100° C. causes the adhesive to melt and allows separation of adhered pieces.

6 Claims, 5 Drawing Sheets

1,1'-(methylenedi-4,1-phenylene)-bismaleimide

N,N'-(4-methyl-1,3-phenylene)-bismaleimide

N,N'-m-phenylene-bismaleimide $((C_4H_2O_2N)C_6H_4)_2(OSi(CH_3)_2)_4O$

METHOD OF MAKING THERMALLY REMOVABLE ADHESIVES

This invention was made with Government support under Contract No. DE-AC04-94AL85000 awarded by the Department of Energy. The Government has certain rights in the invention.

BACKGROUND OF THE INVENTION

The invention relates to thermally removable, polymeric adhesives. More particularly, the invention relates to a method of making thermally removable, polymeric adhesives prepared using the Diels-Alder cycloaddition reaction.

Thermosettable adhesive compositions have been used in a variety of applications where a semi-structural bond between two substrates is required. The semi-structural bond is necessary to ensure that the substrates are inseparable. In most applications, the bond is designed to be permanent. There are applications, however, in which it would be preferable for the adhesive composition to exhibit high performance bond properties during use (i.e., the period and environmental conditions, e.g., temperature range, over which the adhesive composition performs as a semi-structural adhesive), yet be removable after use. A tension exists between these opposing performance criteria. In the aerospace industry, for example, decorative sheets are often adhered to the interior walls of aircraft cabins using thermosettable adhesives. Over time the decorative sheets become marred (e.g., soiled, cut or torn) and styles change. It would be preferable if these decorative sheets could be removed and replaced with new sheets. Following cure, however, substrates bonded together by thermoset adhesive compositions are substantially inseparable. As a result, efforts to separate the substrates are often unsuccessful and result in substrate damage. In addition, the cured adhesive composition exhibits unpredictable cohesive and adhesive failure at either substrate. If the adhesive can be made removable, then the removable adhesives can also be used to form metal-to-metal joints, foam-to-metal joints and foam-to-foam joints that can subsequently be taken apart with no collateral damage to components. These products allow for repairs, upgrades and eventual dismantlement of assemblies.

A variety of thermosettable adhesive compositions are used to form semi-structural bonds to substrates. Thermosettable polyurethane adhesive compositions are often used to bond substrates together. Single package solvent-borne thermosettable polyurethane adhesive compositions rely on atmospheric moisture for curing. Water-borne thermosettable polyurethane adhesive compositions are cured by the addition of water dispersible isocyanate groups to the adhesive composition. The isocyanate groups react with the urea, amino-hydrogen and hydroxyl groups present in the water-borne prepolymer to crosslink the composition. Wesp (U.S. Pat. No. 3,765,972) describes a pressure-sensitive adhesive composition for use wherever a strong permanent bond is desired. The adhesive composition includes a latex and a transient tackifier that includes an epoxy resin and a curing agent. The latex portion of the adhesive composition provides the film-forming capability of the composition.

Recker (U.S. Pat. No. 5,464,902) describes incorporating minor quantities of functionalized, partially crosslinked, elastomeric particles having a glass transition temperature of less than 10° C. into epoxy resin systems to toughen the epoxy resin systems against impact-induced damage. The toughened matrix resin systems may be utilized as neat films in structural adhesives or may be scrim supported.

Loder et al. (U.S. Pat. No. 4,049,483) describe a hot melt adhesive system of hot melt adhesive and inherently tacky elastomeric copolymer microspheres. The hot melt system has pressure sensitive adhesive characteristics at room temperature. The patent further describes adding a tackifying agent to the hot melt adhesive system to enhance the room temperature adhesion of the adhesive surface. Once the hot-melt adhesive system has been heat-activated, the adhesive is capable of forming a substantially permanent high strength hot melt bond. The basic properties of the hot melt matrix are unaffected by the inclusion therein of the microspherical adhesive.

Dershem et al. (U.S. Pat. No. 6,034,194) describe an adhesive consisting essentially of a liquid bismaleimide, alkylenes and aromatic bridging groups. The adhesive is a thermoset that is stable to at least 250° C. The adhesive is not thermally removable at temperatures below 250° C.

Diels-Alder reactions have been shown to produce materials that are thermally removable. For example, Loy et al. (U.S. patent application Ser. No. 09/484,839, now U.S. Pat. No. 6,337,384 B1; incorporated herein by reference) describe epoxide compositions formed by Diels-Alder reactions utilizing bismaleimide and furans to form thermally removable epoxides, but the materials do not possess good removable adhesive properties.

DESCRIPTION OF SPECIFIC EMBODIMENTS

The present invention is a method of making thermally removable adhesive materials by utilizing Diels-Alder reactions in the preparation to incorporate thermally-weak linkages in the prepared compound. The adhesive material can be formed into a solid material, such as a solid film, that can be stored indefinitely. When needed for use, the parts to be adhered have their surface temperature heated high enough to melt the adhesive material placed between the parts. The parts are cured, for example at a temperature of from room temperature to approximately 60° C., after which the parts are adhered together. To break the adhesive bond, the assembly can then be heated above the melting temperature of the adhesive, typically approximately 100° C. up to approximately 130° C. At this elevated temperature, the hot melt material has a low enough viscosity to allow for the parts to be easily pulled or pried apart with very little force. Typically the parts can be separated with only the force of gravity acting on one of the parts while the other part is held stationary.

Diels-Alder reactions between a diene and a dienophile, typically reversible, are known and potentially useful in forming cross-linked materials. The rate of reaction between a diene and dienophile is determined by the diene and dienophile used. Likewise the rate of the reverse reaction (for depolymerization) is also determined by the individual components and the substituents on them. Typically, upon heating, the position of the equilibrium between adduct and dienophile/diene shifts to increase the amount of the diene and dienophile. The reversible Diels-Alder reaction of a maleimide, the dienophile, with functional group R, and a furan, the diene, with functional group R', is known to proceed forward rapidly at 60° C.; however, at a higher temperature, depending upon the particular reactants used, the equilibrium shifts to regenerate the maleimide and furan groups, typically tris(furans) and (tetrakis)furans. A wide variety of functional groups are tolerated by the Diels-Alder reaction. In general, any organic functional group can be used for R or R' where the functional group does not undergo a reaction preferential to the Diels-Alder reaction.

According to the method of the present invention, compounds necessary to form a resin are mixed together at an elevated temperature sufficient so that the compounds mutually dissolve each other (typically around 95±5° C.) and then curative compounds are mixed with these compounds at the elevated temperature to form a hot melt, which, when cooled to approximately room temperature to approximately 70° C., undergoes Diels-Alder and epoxy curing reactions to form an adhesive compound.

Figure 1:
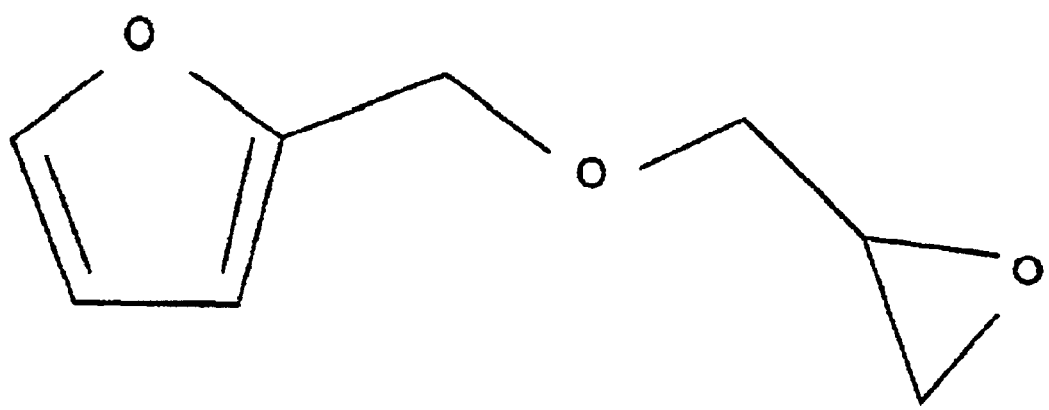
FIG. 1 shows the structure of furfuryl glycidyl ether.
Figure 2:
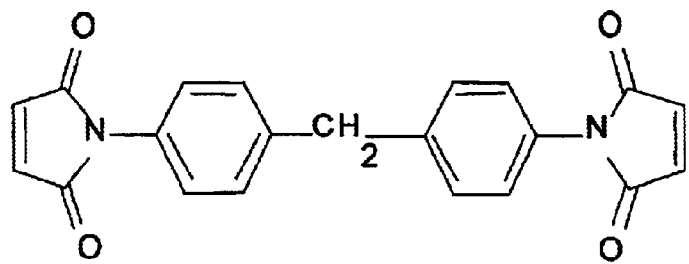
FIG. 2 shows the structure of typical bismaleimides.
Figure 2:
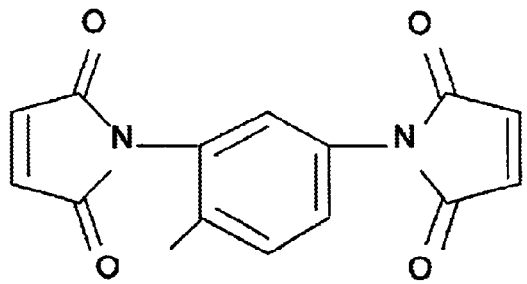
Figure 2:
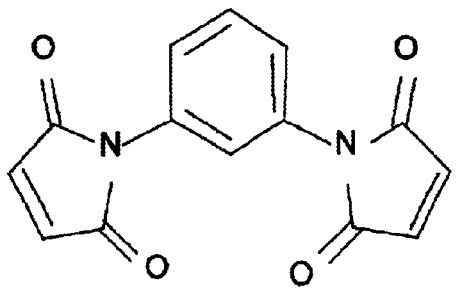
Figure 2:
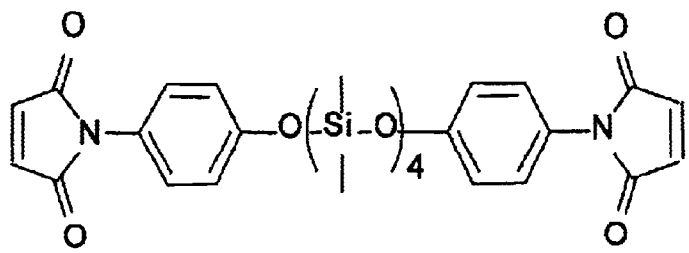

In one embodiment, the adhesive compound is prepared by first dissolving in furfuryl glycidyl ether (chemical formula $C_5H_5O_5$ and molecular weight 154.17 gram/gram-mole, see FIG. 1) at an elevated temperature a bismaleimide, such as 1,1'-(methylenedi-4,1-phenylene)-bismaleimide, (see FIG. 2). This particular bismaleimide is a solid with a melting point of approximately 156–158° C. Other bismaleimides that have been utilized include N,N'-m-phenylene-bismaleimide with melting point of 198–200° C. FIG. 2 shows the structure of these bismaleimides but it is obvious that other similar bismaleimides would work in a similar manner. The temperature of dissolution can be in the range of 90–100° C., but must be at a temperature above the retro Diels-Alder reaction that is typically 90° C. When dissolved at approximately 95° C., a solution results that solidifies at a temperature below 90° C. when the Diels-Alder adduct forms. After the dissolution of the resin constituents, the curing agent or agents, such as diamine curatives, are added to the solution at approximately 95° C. A typical curative mixture contains polyoxypropylenediamine (such as Jeffamine 230, obtained from Huntsman Chemical Co., Houston, Tex., approximate molecular weight 230), polyoxypropylenediamine (Jeffamine 2000, approximate molecular weight 2000), and nonylphenol. The Jeffamine curative mixtures have the general structure

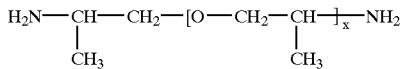

The curatives are blended in and dissolved. Other amine curatives, such as 3-3'-dimethylmethylenedi (cyclohexylamine), or curative mixtures could also be used including other diamine curatives.

Once the curatives are added to the solution, the additional time to fully dissolve all of the ingredients and obtain a homogeneous solution is minimized so as to avoid unwanted side reactions. One unwanted side reaction occurs between the unreacted maleimides and the amines. This Michaels addition is described in the paper by Okumoto and Yamabe (Okumoto, S. and Yamabe, S., J. Org. Chem., 2000, 65, 1544). The reaction is minimized by minimizing the time that the maleimides are exposed to reaction at 95° C. The dissolution time can vary from approximately 10 minutes to approximately 20 minutes. This is sufficient time to obtain a homogeneous solution but avoid substantial side reactions, especially the Michael addition of amine to a maleimide.

Once a homogeneous solution is obtained, the solution is cooled to below approximately 70° C. and the adhesive compound forms. Upon cooling to below 60–70° C., the Diels-Alder reaction occurs which combines the maleimides on the bismaleimides and the furan on the furfuryl glycidyl ether. Simultaneously, the curing reaction between the amines and epoxide (oxirane) proceeds. The formed adhesive compound can be cast, such as into a sheet or film or molded into a specific shape. The formed adhesive is then cured fully. A typical cure is done at 60° C. for 72 hours. The adhesive can also be used as a conformal coating. Once cured, the adhesive compound can be stored indefinitely and used when desired. The resin has no chemical bonds susceptible to hydrolysis.

Figure 4:
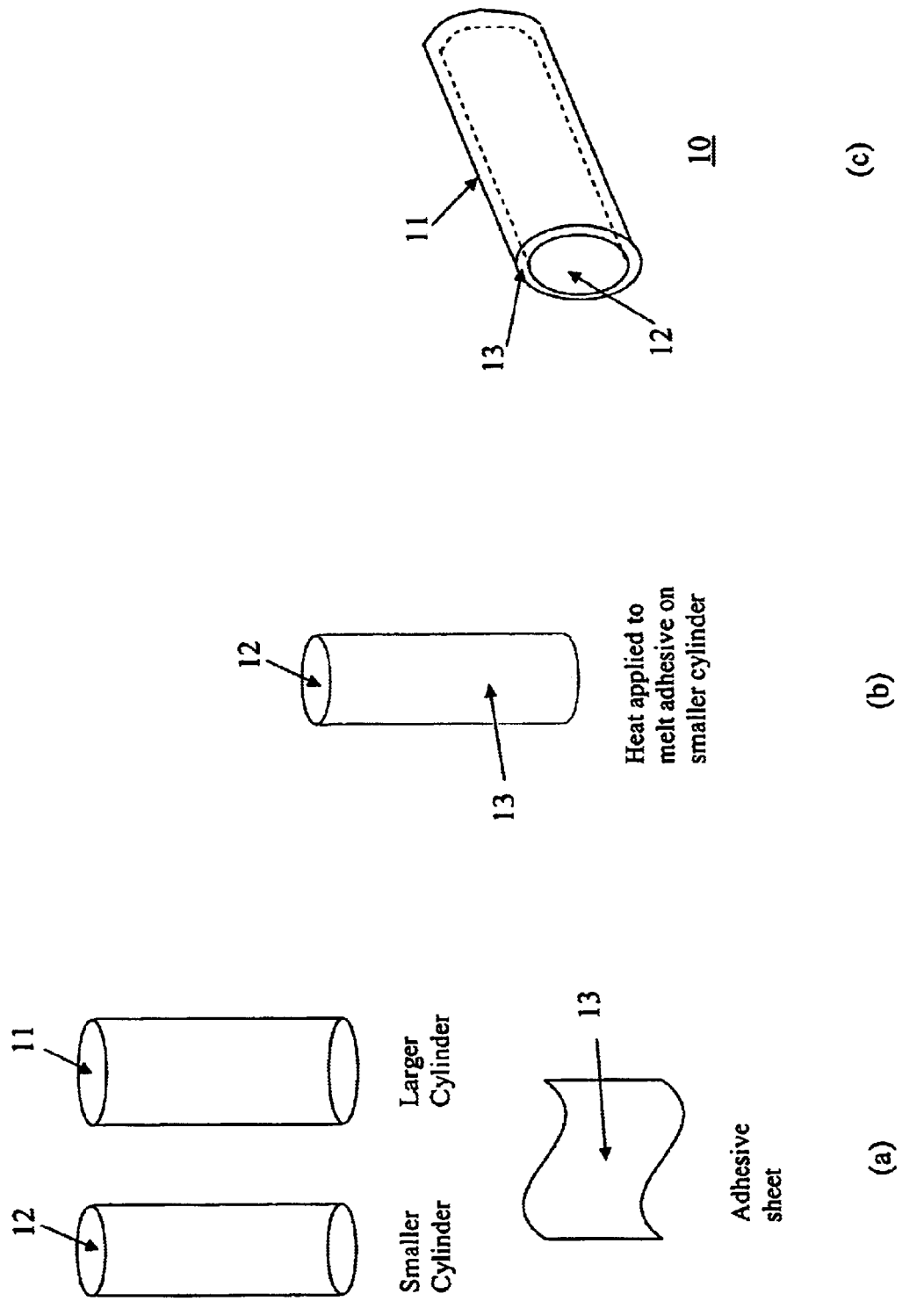
FIG. 4 shows a depiction of a process to adhere two metal cylinders using the adhesive prepared according to the method of the present invention.

Bonding with a removable adhesive can be accomplished in a number of ways. One method is to apply the hot mixture of adhesive ingredients to the surface to be bonded and then to form the bond and cure the adhesive. A potentially more convenient method to form a bond is to utilize pre-formed and cured adhesive sheets. Such an adhesive sheet of thickness 0.010 inches was formed in one embodiment and can be utilized as a hot melt adhesive. The adhesive sheet can be easily cut to the size of the bond area. The thickness of the sheet can be adjusted so that it corresponds to the desired bond thickness. The bond can then be made in a number of ways. The surface with the adhesive sheet placed upon it can be heated to melt the adhesive sheet. This can be done with a heat gun or other heating method. Melting occurs when the retro Diels-Alder reaction occurs (above approximately 90° C.) and results in lower molecular weights that are liquid at the elevated temperature. When the adhesive is melted the other surface to be bonded can be brought into contact with it. The assembly can then be placed in the curing oven to re-cure the adhesive. An example of this process is depicted in FIG. 4, where two metal cylinders are bonded together. A smaller diameter cylinder 12 is to be bonded to a large diameter cylinder 11. An adhesive sheet is prepared according to the method of the present invention, cut to size, and contacted with cylinder 12 and heated to a point where the adhesive sheet 13 melts. The cylinder 12 is placed within cylinder 11, with the diameters such that the adhesive is in contact with both cylinders. The assembly 10 is cured. Alternatively, the adhesive sheet could be placed between the surfaces to be bonded and then the entire assembly heated up to melt the adhesive. Once the adhesive is melted, the assembly can be placed in a cure oven to re-cure the adhesive.

The bond can be broken easily by heating to a temperature near where the adhesive liquefies. The easiest removal condition occurs at a temperature where the adhesive is actually liquefied. This temperature depends upon the exact formulation and can vary from approximately 100° C. to approximately 130° C. When the assembly containing a bond prepared with the removable adhesive is heated to a temperature sufficient to liquefy the adhesive, or to a temperature approaching that, the modulus of the adhesive becomes very small and the parts of the assembly can be readily taken apart with little force. When the bonded assembly depicted in FIG. 4 was heated to the adhesive melting point, approximately 100° C. in this case, no force other than gravity was required to separate the cylinders. The residual adhesive on the surfaces of the separated cylinders were conveniently removed by dissolution at 90° C. in 1-butanol or in methoxyethanol. Other organic solvents could be utilized for this cleaning if they boil above about 90° C., however the alcohols are preferred because they would have little or no effect on other parts of the assembly that might be sensitive to high temperature organic solvents.

If the resin is formed with the inclusion of other compounds in the formulation, such as the bismaleimide $((C_4H_2O_2N)C_6H_4)_2(OSi(CH_3)_2)_4O$ (shown in FIG. 2), the melting point of the resulting adhesive can be slightly lower. The temperature at which the adhesive liquefies can vary between approximately 100° C. and 130° C.

In another embodiment, the adhesive compound is prepared in a similar fashion but with a different class of curative, such as an anhydride. Furfuryl glycidyl ether is mixed with the bismaleimide, N,N'-(4-methyl-1,3-phenylene)-bismaleimide with melting point of 170–172° C. (FIG. 2), and dissolved at 95° C. A high boiling solvent, such as methoxyethanol, can be added to aid dissolution. Once dissolved, the curative, such as maleic anhydride, was added, also at 95° C. Maleic anhydride was used as the curative in this case because a homogeneous solution could not be obtained when diamine curatives, such as the Jeffamine curatives, were utilized. With maleic anhydride, a homogenous solution was obtained at 95° C. This adhesive mixture was then cast and cured. A typical cure was at 60° C. for 72 hours. With an anhydride curative, no Michaels addition occurred. However, other unwanted side reactions are possible at the high temperature of the solution, such as oxidation. These are avoided by minimizing the time that the solution is held at 95° C. The typical dissolution time is 15 minutes, but could range form a few minutes up to approximately 30 minutes. It is obvious that many other anhydrides or mixtures of anhydrides could be used as a curative including chlorendic, dodecenylsuccinic anhydride, nadic methyl anhydride, and pyromellitic dianhydride. In other embodiments other classes of curatives are used such as carboxylic acids or alcohols.

EXAMPLE 1

Figure 3:
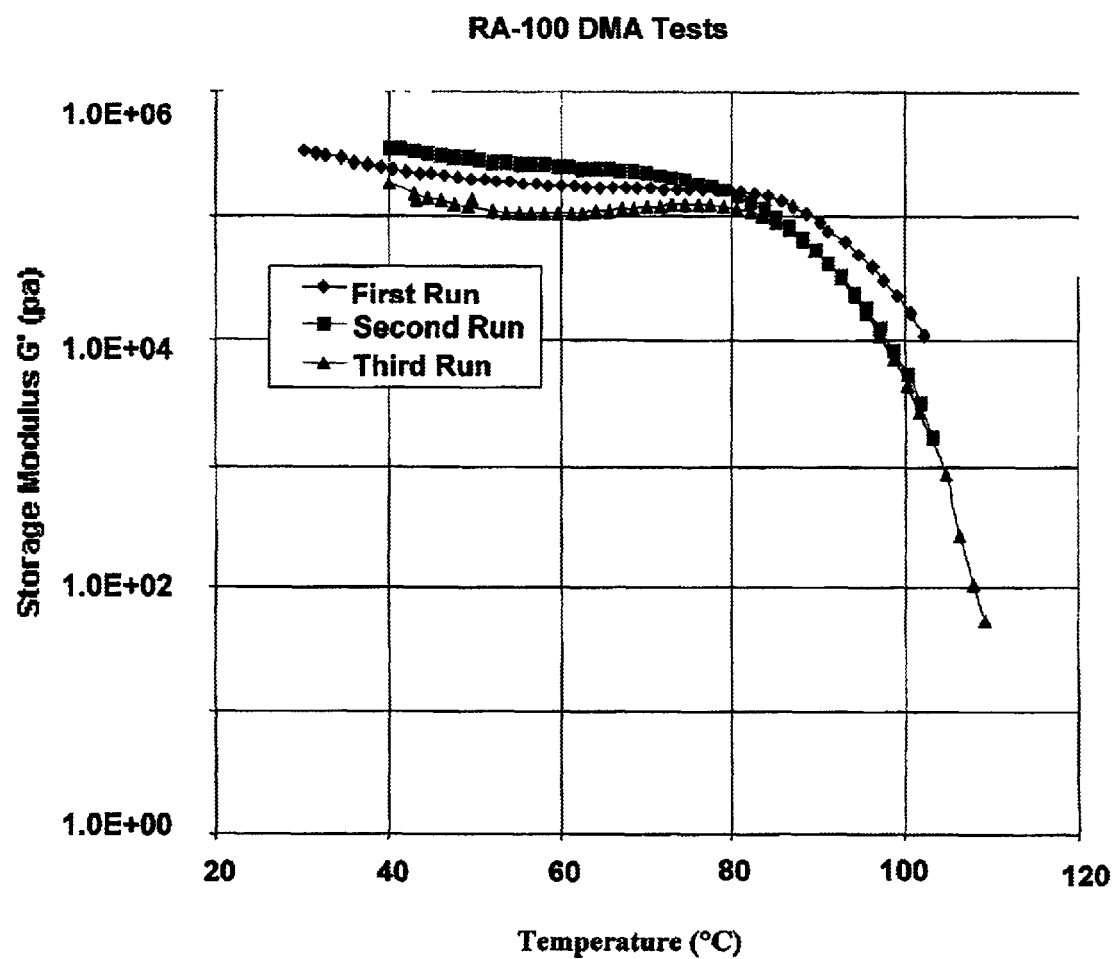
FIG. 3 shows the modulus determined by an oscillatory shear experiment for the adhesive RA100.

An adhesive is prepared by mixing 2.00 grams of 1,1'-(methylenedi-4,1-phenylene)bismaleimide and 1.72 gm of furfuryl glycidyl ether at 95° C. for 15 minutes to produce a homogeneous solution. To this solution is added 0.40 gm of Jeffamine 230, 2.30 gm of Jeffamine 2000, and 0.50 gm of nonylphenol. The mixture is stirred at 95° C. for an additional 15 minutes. The resulting homogeneous solution is poured into a Teflon mold and cured at 60° C. for 72 hours. The cured elastomeric adhesive, called RA100, had a broad glass transition temperature of −45° C. as determined by an oscillatory shear experiment. The modulus, as determined also by an oscillatory shear experiment fell rapidly above about 90° C. as shown in FIG. 3 and was reversible for numerous cycles.

EXAMPLE 2

An adhesive is prepared as in Example 1 except that propylene carbonate is utilized in place of nonylphenol. The cured elastomeric adhesive, called RA110, is more tacky than RA100.

EXAMPLE 3

An adhesive is prepared by mixing 5.22 grams of 1,1'-(methylenedi-4,1-phenylene)bismaleimide, 0.58 gm of the liquid bismaleimide $((C_4H_2O_2N)C_6H_4)_2(OSi(CH_3)_2)_4O$ shown in FIG. 2 and 4.76 gm of furfuryl glycidyl ether at 95° C. for 15 minutes to produce a homogeneous solution. To this solution is added 0.93 gm of Jeffamine 230, 5.31 gm of Jeffamine 2000, and 1.16 gm of nonylphenol. The mixture is stirred at 95° C. for an additional 15 minutes. The resulting homogeneous solution is poured into a Teflon mold and cured at 60° C. for 72 hours. The cured elastomeric adhesive, called RA122, had glass transition temperature of −20° C. as determined by an oscillatory shear experiment and would liquefy at approximately 100° C.

EXAMPLE 4

The adhesive prepared according to Example 3 was cast as a film of nominal thickness 0.010 inches. This adhesive was used to bond two stainless steel cylinders that were machined to have a taper and fit together with a 0.010 inch gap for bonding. The bonding was done by cutting the appropriate sized sheet of adhesive and placing it on the inner cylinder and preheating to 60° C. The outer cylinder was heated to 110° C. and then placed over the adhesive. Because of the thermal mass of this outer cylinder this caused the adhesive to melt. The assembly was then cured at 60° C. for 72 hours after which a strong adhesive bond was established holding the two cylinders together. The bonded cylinders were taken apart by heating the assembly to 100° C. at which temperature the adhesive liquefied. When this temperature was attained the cylinders were taken apart by lifting the outer cylinder off of the inner cylinder for the assembly 10 depicted in FIG. 4. The residual adhesive on the surfaces of the separated cylinders were conveniently removed by dissolution at 90° C. in 1-butanol or methoxyethanol. Other organic solvents could be utilized for this cleaning if the solvents boil above about 90° C.; however, the alcohols are preferred because they would have little or no effect on other parts of the assembly that might be sensitive to high temperature organic solvents.

EXAMPLE 5

The adhesive prepared according to Example 4 was used to bond a disk of epoxy foam of density 20 lb/ft$^3$ to a disk of an epoxy/Kevlar composite. The bond was stronger than the epoxy foam as evidenced by the following. When the bond was broken at room temperature by prying the assembly apart, the foam would fracture. If the assembly was heated to 100° C., then the assembly could be lifted apart with no damage to the components and with the adhesive liquefied.

EXAMPLE 6

The adhesive prepared according to Example 4 was used to bond a glass vial (Kimble Glass) to a ⅜ inch stainless steel elbow with pipe threads. The glass vial was approximately ½ inch in diameter and 4 inches long. The glass vial has a threaded end normally used for a cap. After bonding, the glass vial was filed with compressed air to a pressure of 100 psi. The supply gas was shut off and the pressure in the assembly observed via an attached pressure gauge. The bonded assembly held pressure for the one-hour test. After testing, the pressure was removed and the vial removed from the stainless steel elbow by heating the assembly to 100° C. at which temperature the adhesive liquefied. The parts were then separated and the stainless steel elbow cleaned and was available for re-application.

EXAMPLE 7

An adhesive is prepared by mixing 4.35 grams of 1,1'-(methylenedi-4,1-phenylene)bismaleimide, 1.45 gm of the liquid bismaleimide $((C_4H_2O_2N)C_6H_4)_2(OSi(CH_3)_2)_4O$ shown in FIG. 2 and 4.42 gm of furfuryl glycidyl ether at 95°

C. for 15 minutes to produce a homogeneous solution. To this solution is added 0.86 gm of Jeffamine 230, 4.90 gm of Jeffamine 2000, and 1.07 gm of nonylphenol. The mixture is stirred at 95° C. for an additional 15 minutes. The resulting homogeneous solution is poured into a Teflon mold and cured at 60° C. for 72 hours. The cured elastomeric adhesive, called RA120, melts at approximately 100° C.

EXAMPLE 8

We prepared an adhesive according to Example 1 and Example 7 and applied them to the bonding of 304 stainless steel coupons and aluminum coupons for lap-shear adhesive strength testing. The bond thickness was 0.005 inches and the surface area that was bonded was 1 inch$^2$. The surfaces of the coupons were prepared by grit blasting with aluminum oxide powder and then cleaning with a commercial metal surface cleaner, Brulein. For comparison we prepared lap-shear samples also with a commercial elastomeric silicone adhesive, Sylgard 184 that were prepared in an identical manner. For the aluminum lap-shear tests the average loads at failure were: RA100–593 lbs, RA120–790 lbs, Sylgard 184–487 lbs. For the 304 stainless steel lap-shear tests the average loads at failure were: RA100–661 lbs, RA120–811 lbs, Sylgard 184–674 lbs.

EXAMPLE 9

Figure 5:
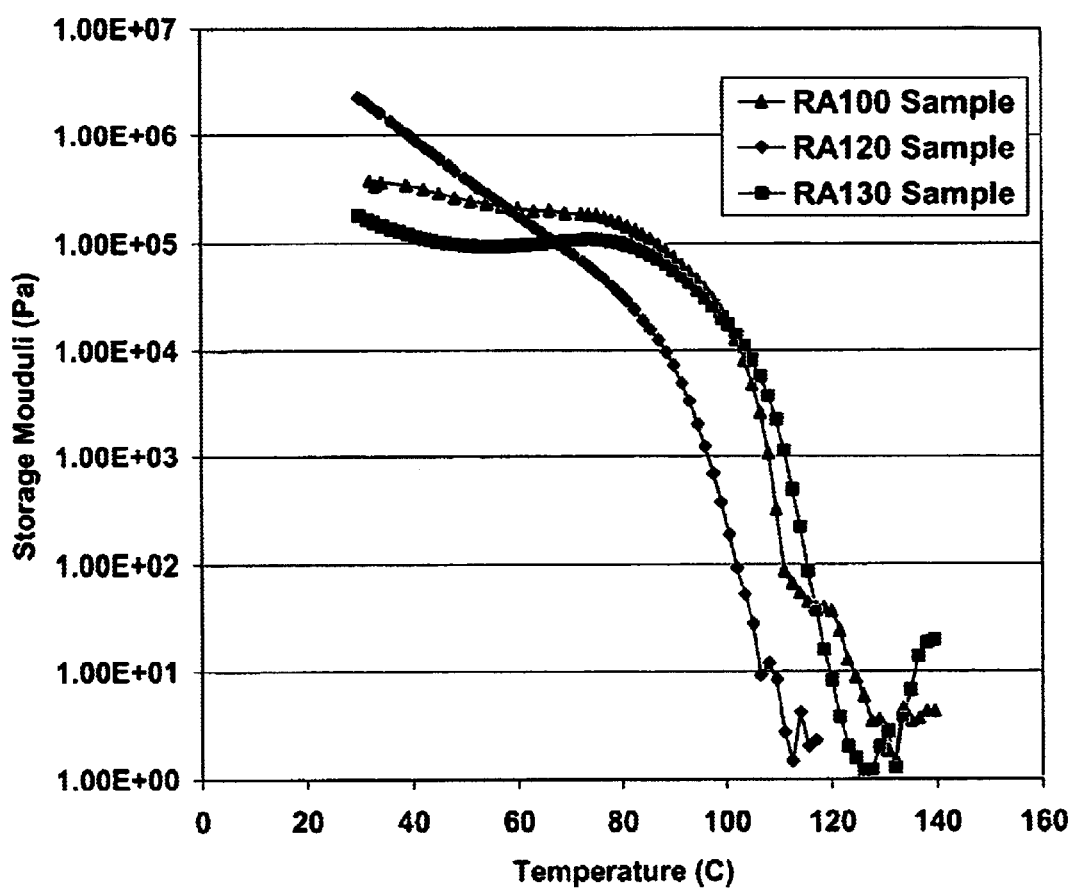
FIG. 5 shows the modulus determined by an oscillatory shear experiment for the adhesive RA100, RA120, and RA300.

An adhesive is prepared by mixing 2.00 grams of N,N'-m-phenylene-bismaleimide and 2.30 gm of furfuryl glycidyl ether at 95° C. for 15 minutes to produce a homogeneous solution. To this solution is added 0.60 gm of Jeffamine 230, 3.45 gm of Jeffamine 2000, and 0.75 gm of nonylphenol. The mixture is stirred at 95° C. for an additional 15 minutes. The resulting homogeneous solution is poured into a Teflon mold and cured at 60° C. for 72 hours. The cured elastomeric adhesive, called RA300, had a slightly higher melting temperature as compared to RA100 and RA120 as shown in FIG. 5.

EXAMPLE 10

An adhesive is prepared by mixing 2.00 grams of N,N'-(4-methyl-1,3-phenylene)-bismaleimide, 2.18 gm of furfuryl glycidyl ether, and 1.00 gm of methoxyethanol at 95° C. for 15 minutes to produce a homogeneous solution. The methoxyethanol serves only as a solvent to aid in the dissolution. To this solution is added 1.40 gm of maleic anhydride. The maleic anhydride is an epoxy curative. The mixture is stirred at 95° C. for an additional 15 minutes. The resulting homogeneous solution is poured into a Teflon mold and cured at 60° C. for 72 hours. During the cure, the Diels-Alder adduct is formed, the epoxy reacts with maleic anhydride and the methoxyethanol evaporates. The cured glassy adhesive is called RA400 and liquefies at approximately 90° C. The lower melting temperature of RA400 is probably due to the greater concentration of Diels-Alder bonds in this adhesive that occurs because of the low molecular weight of the curative.

EXAMPLE 11

An adhesive was prepared according to Example 3 and cast into a film of approximately 0.20 inches thickness. This adhesive sheet was used to bond two pieces of cotton cloth together by placing the adhesive between the two sheets of cloth and heating with an iron that had a surface temperature of 110° C. When the cloths were allowed to cool, they were bonded together. The cloths were pulled apart and it was observed that the adhesive failed cohesively. The cloths could be repeatedly bonded together by heating with the iron. This example demonstrates that the adhesives of the present invention can be used to bond both inorganic and organic pieces.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of making a thermally-removable adhesive, comprising the steps of:

mixing a bismaleimide compound and a monomeric furan compound, said monomeric furan compound containing an oxirane group, at an elevated temperature of greater than approximately 90° C. to form a homogeneous solution;

mixing a curative at said elevated temperature to form a second homogeneous mixture; and cooling said second homogeneous mixture to a temperature less than approximately 70° C. to simultaneously initiate a Diels-Alder reaction between said furan and said bismaleimide and a epoxy curing reaction between said curative and said oxirane group, thereby forming a thermally-removable adhesive.

2. The method of claim 1 wherein the curative is selected from the group consisting of amine curatives, anhydrides, carboxylic acids, and alcohols.

3. The method of claim 1 wherein the curative is selected from the group consisting of chlorendic, dodecenylsuccinic anhydride, nadic methyl anhydride, pyromellitic dianhydride, maleic anhydride, 3-3'-dimethylmethylenedi (cyclohexylamine), polyoxypropylenediamine, and nonylphenol.

4. The method of claim 1 wherein the monomeric furan is furfuryl glycidyl ether.

5. The method of claim 1 wherein the bismaleimide compound is selected from 1,1'-(methylenedi-4,1-phenylene)-bismaleimide, N,N'-(4-methyl-1,3-phenylene)-bismaleimide, N,N'-m-phenylene-bismaleimide, and $((C_4H_2O_2N)C_6H_4)_2(Obi(CH_3)_2)_4O$.

6. The method of claim 1 wherein the second homogeneous mixture is formed within less than approximately 20 minutes.

* * * * *